United States Patent
Domres et al.

(10) Patent No.: US 7,072,562 B2
(45) Date of Patent: Jul. 4, 2006

(54) OPTICAL FIBERS MADE FROM MULTICOMPONENT GLASS

(75) Inventors: Ralf Domres, Ruemmelsheim (DE); Norbert Wolfram Gehenn, Mainz (DE); Uwe Kolberg, Mainz (DE); Georg Krolla, Mainz (DE); Frank Thomas Lentes, Bingen (DE)

(73) Assignee: Schott Glas, Mainz (DE)

( * ) Notice: Subject to any disclaimer, the term of this patent is extended or adjusted under 35 U.S.C. 154(b) by 387 days.

(21) Appl. No.: 10/674,601

(22) Filed: Sep. 30, 2003

(65) Prior Publication Data

US 2005/0100305 A1 May 12, 2005

(30) Foreign Application Priority Data

Oct. 2, 2002 (DE) .......................... 102 45 987

(51) Int. Cl.
*G02B 6/00* (2006.01)

(52) U.S. Cl. .................. 385/142; 385/141; 385/144
(58) Field of Classification Search ................ 385/141, 385/142, 144
See application file for complete search history.

(56) References Cited

U.S. PATENT DOCUMENTS

| 4,264,131 | A | * | 4/1981 | Sawamura et al. ......... 385/142 |
| 4,277,270 | A | * | 7/1981 | Krohn ........................ 65/404 |
| 4,453,962 | A | * | 6/1984 | Harada et al. ................ 65/405 |
| 4,573,762 | A | * | 3/1986 | Joormann et al. .......... 385/142 |
| 4,871,230 | A | * | 10/1989 | Yamashita et al. .......... 385/123 |
| 5,034,354 | A | * | 7/1991 | Fine ............................ 501/74 |
| 2002/0192421 | A1 | * | 12/2002 | Jennings et al. ........... 428/64.1 |
| 2003/0072554 | A1 | * | 4/2003 | Dohmen et al. ............ 385/142 |
| 2004/0109225 | A1 | * | 6/2004 | Hu et al. .................. 359/341.1 |

FOREIGN PATENT DOCUMENTS

| DE | 29 40 451 | 4/1980 |
| DE | 199 58 522 A1 | 6/2001 |
| EP | 0 018 110 A1 | 10/1980 |
| EP | 0 081 928 | 4/1986 |
| JP | 54-087236 | 7/1979 |

* cited by examiner

*Primary Examiner*—Brian Healy
*Assistant Examiner*—Charlie Peng
(74) *Attorney, Agent, or Firm*—Michael J. Striker

(57) ABSTRACT

The stepped optical fiber has a core glass member and a surrounding cladding glass member. It has a high numerical aperture (NA)$\geq$0.50. The core glass member preferably has a zinc-containing composition including, in % by weight, $SiO_2$, 42 to 53; ZnO, 16 to 38; PbO, 1 to 20; $Na_2O$, <14; $K_2O$, <12; with a sum of ZnO and PbO$\geq$30 and a sum of $Na_2O$ and $K_2O$ is $\geq$2. The cladding glass composition, which is compatible with this core glass, includes, in percent by weight, $SiO_2$, 60 to 72; $B_2O_3$, <20; $Al_2O_3$, <10; $Na_2O$, <18; and $K_2O$, <15. The resulting optical fiber has low attenuation, very neutral color transmission and low manufacturing costs. Other cladding glass compositions resulted in considerably poorer properties with too much crystallization at the core glass boundary layer. Environmentally-friendly, lead-free embodiments of the core glass were also prepared having even lower aperture values of $\geq$0.48.

38 Claims, 1 Drawing Sheet

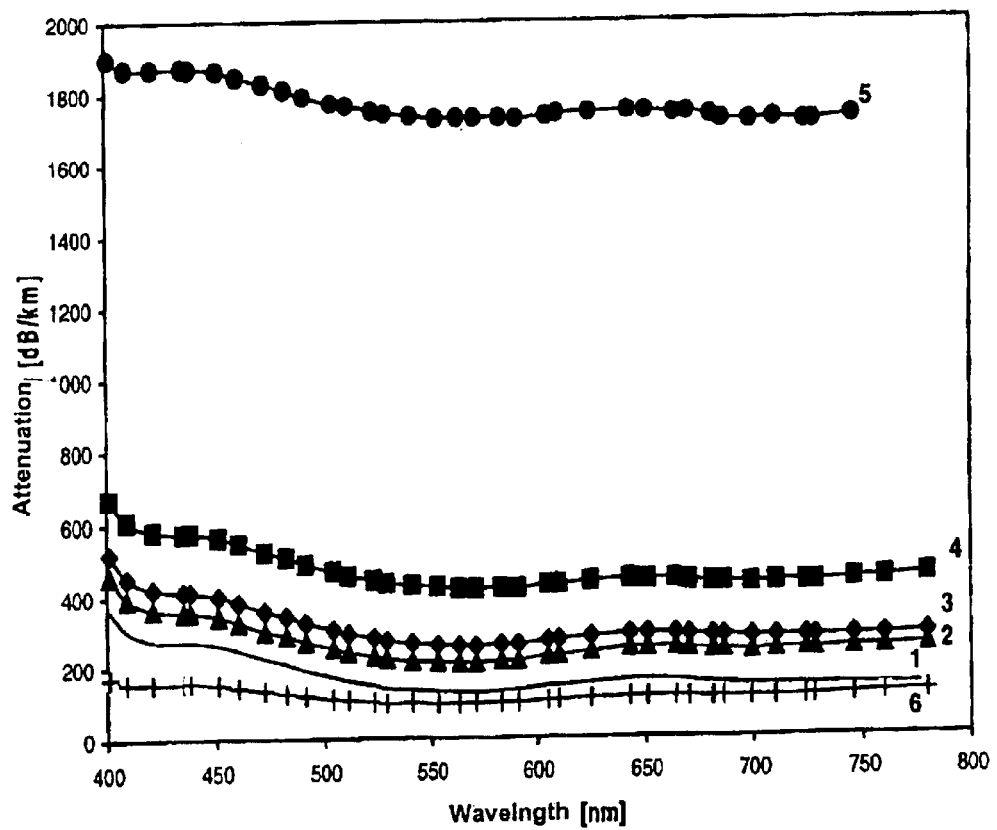

OPTICAL FIBERS MADE FROM MULTICOMPONENT GLASS

BACKGROUND OF THE INVENTION

1. Field of the Invention

The invention relates to a stepped optical fiber, which consists of multicomponent glass and comprises a core glass member and a cladding glass member completely surrounding the core glass member around its peripheral wall. It also relates to the use of this sort of stepped optical fiber.

2. Description of the Related Art

Generally a glass fiber or optical fiber for light transmission is made from a highly refractive core glass member and a cladding glass member surrounding it, which has a lower index of refraction than the core glass. A light transmitting glass body in fiber form, in which the index of refraction is constant across the cross-section of the core glass member, is called a stepped optical fiber. A glass fiber of this type transmits light, which is coupled into one end of the optical fiber, to the other end of the optical fiber. The light is completely reflected (total reflection) at the boundary surface between the core glass member and the cladding glass member.

The amount of light, which can be coupled into this sort of optical fiber and which can be transmitted by it, is proportional to the square of the numerical aperture (NA) of the fiber and the cross-sectional area of the fiber core. In order to transmit as much light as possible over short to medium distances (<100 m), these types of stepped fibers are frequently tightly packed fiber bundles, provided with a protective tube. Their ends are glued into a metal sleeve and their front faces are worked to form optically plane surfaces by grinding and polishing. The corresponding packaged optical fiber bundle is called a fiber optic light guide.

Fiber optic light guides are used in many diverse engineering and medical application areas (generally industrial engineering, lighting, traffic engineering, automobile industry, architecture, endoscopy, dental medicine). Their most important function is the transmission of as much light as possible from one location A to another location B, over short to medium distances (somewhat less than the maximum of 100 m). Frequently the light originating from a powerful light source, for example the light from a halogen or discharge lamp is coupled into the fiber optical bundle by means of optical auxiliary components, such as lenses and reflectors.

The higher the aperture (NA) of the individual fibers contained in the bundle, the greater the amount of light that can be transmitted.

The amount of light transmitted through the fiber optic light guide also depends on the transmission properties of the glass through which it is transmitted as well as the aperture. Only a core glass member of certain definite glass composition and made with raw materials of very high purity, from which it is made, guides light with as little attenuation as possible over the entire length of the light guide.

The raw materials for melting this sort of core glass are very expensive because of the required high purity, which can lead to considerable manufacturing cost for these fibers and/or the light guides made from them.

Besides the amount of light, which a fiber-optic light guide transmits, transmission of the light without chromatic effects frequently plays an important role. More or less great color shifts in the light from the light source coupled to the light guide occur because of the spectral transmission dependence of the core glass. These color shifts can cause a noticeable yellow tint to the light exiting from the light guide. Above all this is troublesome in fields, which require color neutral image reproduction, such as in the medical endoscopy with photographic image documentation for differentiation of e.g. malignant from healthy tissue.

The making of optically stepped fiber from multicomponent glass takes place either by the so-called double crucible or rod-tube process. In both cases the core and cladding glass is heated to temperatures, which correspond to a viscosity range between $10^4$ to $10^3$ dPas and is drawn to a fiber. So that a stable fiber with low attenuation can be made, core and cladding glass must be compatible with each other in a series of properties, such as viscosity behavior, thermal expansion, crystallization inclination or tendency. Especially contact reactions and/or crystallization may not occur at the boundary surface between the glass fiber core and cladding members. These contact reactions and crystallization may interfere with the total reflection of the light guided through it and thus may make the fiber unsuitable for the applications requiring light guidance with low attenuation. Moreover the mechanical strength of the optical fiber may be negatively impaired by crystallization.

At least three different fiber systems are known for such applications in the current state of the art.

The best-known and most widely used fiber system comprises a core glass member with a high lead composition (mostly ≧35% PbO) and an alkaliborosilicate glass acting as cladding glass. Its advantage is in the high numerical aperture achieved (up to more than 0.7 with a lead content of the core glass of greater than 50%) with reduced manufacturing costs and very good drawing properties for drawing to fiber without crystallization problems.

In contrast to that it has several disadvantages including average to poor attenuation (≧200 to 300 dB/km) and comparatively poor color shifting, chiefly caused by Pb-self-absorption (blue edge of the visible spectrum) as well as introduced impurities of strongly colored elements, such as chromium and nickel. Furthermore lead is rejected more and more as environmentally unfriendly and loading the environment. Thus in specific application areas either this fiber system is used with limitations or not at all.

A second known fiber system comprises an alkaline borosilicate glass, which is used for both the core glass member and the cladding glass member.

Different systems of this second type are described in the patent literature, e.g. EP 0018110 or EP 0081928, both from the British Patent Office. Glass compositions for optical fibers are also described in the Japanese Patent Literature, e.g. DE 29 40 451 C2 or U.S. Pat. No. 4,264,131, owned by Tokyo Shibaura Denki Kabushiki Kaisha. This glass contains a high content of alkali earth oxides and/or zirconium and germanium oxides, in order to attain the desired high index of refraction.

Its advantages include an extraordinarily lower attenuation (currently at ≦10 dB/km) and very lower color shift with currently mostly environmentally friendly raw materials (with the exception of an embodiment, which contains a large amount of barium, e.g. DE 2940451 C2). However these glasses provide glass fibers with a generally small aperture (NA) and a not very high chemical resistance. This latter disadvantage requires that the fibers are provided with a plastic jacket immediately during their manufacture after the drawing step, e.g. from the nozzle of a double crucible, as a protection against possible chemical reaction and/or mechanical action. Furthermore the very low attenuation is obtained by using more highly pure and thus even more expensive raw materials.

These latter aspects, i.e. high manufacturing cost and the plastic jacket, make the use of this fiber system as a fiber bundle for wide applications practically impossible. Furthermore this fiber system is used as individual fiber for data or energy transmission (laser fiber) in many special applications.

The third fiber system is mainly used for optical fiber bundles for light transmission. Fibers made from pure quartz provide the basis for this third fiber system.

Its advantages include an extremely low attenuation (up to $\leq 6$ dB/km), very good color neutrality and it is sufficiently environmentally friendly. However these advantages are accompanied by a very high cost as its most serious disadvantage. Pure quartz material is extremely expensive because of its high processing temperatures. An expensive dosing process, the so-called preform, is required, in which the required index of refraction reduction of the pure quartz is obtained by introducing fluorine into the surface, which is necessary for optical isolation for light transmission in the finished fiber. Also the achievable aperture (NA) of the quartz fiber is very limited ($\leq 0.22$).

U.S. Pat. No. 4,573,762 and JP 54-087236 A discloses a stepped fiber with a core glass member and a cladding glass member. In the first named reference the numerical aperture of the glass fibers is always less than 0.5.

SUMMARY OF THE INVENTION

It is an object of the present invention to provide an optical fiber, which has as wide as possible an area of application, especially as an optical fiber for a fiber bundle and/or a fiber-optic light guide, which is characterized by a high numerical aperture ($\geq 0.50$), a low to average attenuation across the entire visible spectrum, small color shifts, good drawing properties, good drawability, i.e. without a tendency to crystallize or have boundary surface reactions, during manufacture, and environmentally friendly raw material ingredients for the core glass member and cladding glass member in comparison to lead-containing flint glass, which contains a large proportion of lead.

It is another object of the present invention to provide a completely or at least a nearly completely lead-free optical fiber with a numeric aperture $\geq 0.48$ and which has the above-described properties set forth in the above object.

It is a further object of the present invention to provide methods of using the optical fibers according to the invention for various applications.

It is an additional object of the present invention to provide apparatus for various applications including the optical fiber according to the invention.

These objects, and others which will be made more apparent hereinafter, are attained in a stepped optical fiber, which comprises a core glass member and a cladding glass member completely surrounding the core glass member, wherein the core glass member has a core glass composition, which comprises

| | |
|---|---|
| $SiO_2$ | 42 to 53% by weight, |
| ZnO | 16 to 38% by weight, |
| PbO | 1 to 20% by weight, |
| $Na_2O$ | <14% by weight, |
| $K_2O$ | <12% by weight, | wherein a sum total of ZnO and PbO $\geq 30$% by weight and a sum total of $Na_2O$ and $K_2O$ is $\geq 2$% by weight, and optionally at least one refining agent in a standard amount suitable for refining; and wherein the cladding glass member has a cladding glass composition, which comprises

| | |
|---|---|
| $SiO_2$ | 60 to 72% by weight, |
| $B_2O_3$ | <20% by weight, |
| $Al_2O_3$ | <10% by weight, |
| $Na_2O$ | <18% by weight, |
| $K_2O$ | <15% by weight, | and optionally at least one refining agent in a standard amount for refining.

For the embodiment, in which a lead-free stepped fiber should be used, the object is attained with a lead-free stepped optical fiber, whose core glass has a composition, which comprises

| | |
|---|---|
| $SiO_2$ | 42 to 53% by weight, |
| ZnO | 30 to 38% by weight, |
| $Na_2O$ | <14% by weight, |
| $K_2O$ | <12% by weight, |
| BaO | <9% by weight. | wherein a sum total of $Na_2O$ and $K_2O$ is $\geq 2$% by weight; and wherein the cladding glass member has a composition, which comprises

| | |
|---|---|
| $SiO_2$ | 60 to 72% by weight, |
| $B_2O_3$ | <20% by weight, |
| $Al_2O_3$ | <10% by weight, |
| $Na_2O$ | <18% by weight, |
| $K_2O$ | <15% by weight. |

The core glass and/or the cladding glass can also include at least one refining agent in a standard amount suitable for refining.

In the German Patent Application DE 199 58 522 A1 zinc-containing optical glass is described with an index of refraction $n_d$ between 1.52 and 1.66. Besides ZnO these glasses contain at most PbO in various percentages and primarily alkali metals and a few other elements, such as B, Ba, Mg, Ca, Al, Y, Zr and Ge. The reference describes 24 examples.

Most of the glasses described there are characterized by a highly pure transmission and good color neutrality. Besides these optical properties the glasses also have good crystallization stability and meltability. These properties allow these glasses to be considered as possible core glass candidates for optical stepped optical fibers, in so far as a suitable compatible cladding glass can be found.

Although zinc-containing optical glasses are more strongly inclined to crystallize than the lead-containing glass system based on that in DE 199 58 522 A1, glasses could be found, which were suitable for the optical fibers.

Preferred small composition ranges result in an optical fiber according to the invention with especially lower attenuation with only certain cladding glass of certain specific types of composition. Outside these composition ranges either attenuation increases to or exceeds that of the lead glass with equal aperture NA or crystallization begins to set in at the boundary surface with the core glass.

On the other hand, experiments show that core glass with ingredients within the optimum concentration ranges, which is drawn to form an optical fiber with cladding glass having compositions that differ from those according to the invention, has poorer attenuation properties, than optical fiber made with the cladding glass according to the invention. The measured attenuation was a factor of three greater (poorer) than optical fibers made with the cladding glass type according to the invention. In other words, more limited concentration ranges for the ingredients of the zinc-containing optical glass described in DE 199 58 522 A1 were found, whereby core glass with ingredients in these more limited ranges could be drawn to form optical fiber with the cladding glass according to the invention. The objects of the present invention are fulfilled in a special manner with optical fiber prepared in this latter manner. An optical fiber according to the main independent claim below has a large numerical aperture of $\geq 0.50$, has a reduced attenuation of 80 dB/km to 165 dB/km, depending on the purity of the raw material used, has a small color shift ($\Delta D(451$ nm/553 nm)<205 dB/km), has a small cost, has good drawability, and largely comprises environmentally friendly raw materials.

If one drops the above-mentioned requirement that the aperture NA$\geq 0.50$ and reduces it to aperture NA$\geq 0.48$, the lead-free core glass described herein-above may be used. Otherwise this lead-free core glass has largely the same positive properties as the core glass containing lead described above. Accordingly examples of these glasses are provided as examples 5 to 8 in Table I below.

In the following description how the optical fiber according to the invention evolved and resulted from targeted experiments from the zinc-containing core glass described in DE 199 58 522 A1 and several different cladding glasses is described. At the same time concentration limits for ingredients are named, within which the fiber attenuation increases to a level corresponding to the state of the art or poorer or a drawing of fiber is no longer possible because of contact reaction/crystallization.

As mentioned above, stepped optical fiber from multicomponent glasses are made either according to the double crucible method or the rod-tube method. In the present case the stepped optical fiber was exclusively made by the rod-tube method, since a double crucible was not available and the various cladding glass member embodiments were already in tubular form.

In the rod-tube method a cylindrical rod made from a high index of refraction glass and the tube made from low index of refraction cladding glass surrounding it are heated in a cylindrical oven to a temperature corresponding to a viscosity of about $10^4$ to $10^3$ dPas. Core glass and cladding glass melt to form a so-called drawing bulb, from which the optical fiber is drawn. The fiber diameter depends on the ratio of the fiber drawing speed to the guidance speed of the rod-tube system and the diameter of the core rod and tube. Special care is taken in this process so that the core rod surface and the tube inner surface are extremely clean and free of any dirt and particles, so that they can melt to form as ideal trouble-free boundary surface as possible. Similarly it has proven advantageous when the outer diameter of the core rod and the inner diameter of the tube differ by only a few tenths of a mm, so that a uniform fault-free drawing bulb can form.

The necessary core glass rods of different composition were made as follows:

For every selected glass composition from DE 199 58 522 A1 a 4 l melt was melted from the starting raw material and poured to form a bar (about 400 mm×200 mm×50 mm). Two to three cylindrical rods, about 300 mm long and having a diameter of 30 mm, were mechanically machined from this bar. In later working steps the rods obtained a fine optical polish, in order to fulfill the above-described specification for an ideal boundary surface. As many as 15 different core glass types were melted with concentrations of melt ingredients according to the invention and were processed to form core glass rods with the same glass compositions as the examples and also with other glass compositions.

The different cladding glasses required for fiber drawing were put, as mentioned above, in suitable tubular form (inner diameter about 31 mm, outer diameter about 34 mm to 35 mm). Machine-made tubes were drawn from Pt nozzles, whose dimensions were calibrated narrowly, so that no additional mechanical working was required. The core rod and cladding tube were carefully cleaned in a US bath according to current methods only prior to assembly in a rod-tube system shortly prior to the drawing process, in order to guarantee an optimum boundary surface on melting in the drawing process.

The drawing to form optical fiber occurred in a rod-tube-drawing machine with a cylindrical oven according to the state of the art. Fibers with a 70 μm diameter were drawn exclusively. This corresponds to a worldwide standard, which has been adopted for multicomponent optical fiber, which is almost exclusively processed to form fiber bundles. The measurement of the attenuation occurred according to the so-called back-cutting method (DIN 58 141-1).

The stepped optical fiber according to the invention can be used both in light transmission and data transmission. Typical applications for light transmission occur in the automobile industry (interior and exterior vehicle lights), medical technology (endoscopy, operation microscope) and signal engineering (traffic signs and railroad signals) as well as alphanumeric sign or signaling systems. Applications for data transmission occur similarly in the automobile industry and also in general in industry and household engineering.

BRIEF DESCRIPTION OF THE SEVERAL VIEWS OF THE DRAWING

The objects, features and advantages of the invention will now be illustrated in more detail with the aid of the following description of the preferred embodiments, with reference to the sole FIGURE, which is a graphical illustration of the dependence of measured attenuation values for examples of optical fibers according to the invention as a function of wavelength of the transmitted light.

The following examples illustrate the above-described invention in more detail, but the details in these examples should not be considered as limiting the claims appended hereinbelow.

EXAMPLES

The formulation of core and cladding glasses of different compositions occurred based on the principle of optimization of the properties catalog of the optical fiber made from them. Large numerical aperture, low attenuation, low manufacturing cost and environmental friendliness of the raw materials are prominent members of that catalog. Of course crystallization-free drawability must be guaranteed.

In a first series of experiments different varieties of core glass were drawn to form optical fibers with only one cladding glass, the alkali borosilicate glass according to Table II, cladding glass embodiment 1, which has proven to be especially advantageous. The results for the optical fiber made in these experiments for a total number of 8 trial core glass compositions are tabulated in Table I.

For the case of an optical fiber required to have a numerical aperture NA≧0.50, core glass embodiment 1 has the absolutely lowest attenuation level (80 dB/km at 553 nm when the raw materials employed have very high purity). It contains only 3.5% PbO and had a numerical aperture of 0.522 with the alkali borosilicate glass type 1.

Core glass compositions with lower PbO content, e.g. 1.3%, have poorer attenuation and exhibit starting crystallization. When the PbO content is greater than 3.5% indeed good drawability is guaranteed (core glass embodiments 3 and 4), generally attenuation again clearly improves. With a PbO content >19% the attenuation of the original fiber is again reached. The exact numerical value depends on the quality of the raw material used. Furthermore it is advantageous to use the toxic ingredient PbO in as small an amount as possible. The maximum PbO content is limited to 20% by weight, and in a preferred embodiment, to 12% by weight. The minimum concentration of PbO is about 2% by weight in order to guarantee a reliable drawing process.

This situation is limited to core glass embodiments, which contain only five raw material ingredients, $SiO_2$, ZnO, PbO, $Na_2O$ and $K_2O$.

For lead-free core glass embodiments, which may be satisfactorily drawn to optical fiber with a suitable cladding glass, one or more additional raw material ingredients must replace the omitted PbO. $Li_2O$, BaO and $ZrO_2$, which were tested with the core glass embodiments in different composition ratios (see Table I), are especially satisfactory and suitable candidates.

A numerical aperture, NA, greater than 0.53 for the optical fiber could be obtained using at least $Li_2O$ and BaO and/or $Li_2O$, BaO and $ZrO_2$. This generally loads the attenuation, which drops to an average value of 160 to 230 dB/km, which is generally still lower than that of the conventional flint glass fiber (compare with the core glass embodiments 5 and 6, Table I).

If the $Li_2O$ ingredient is omitted from the raw material for the core glass and BaO and $ZrO_2$ or only BaO are included in it, the numerical aperture, NA, of the fiber drops to greater than or equal to 0.50 and/or 0.48, but generally the attenuation is advantageously lowered (core glass embodiment 7 and 8, Table I).

From a comparison of core glass embodiments 7 and 8 in Table I it is clear that increasing amounts of $ZrO_2$ cause deterioration in the attenuation. On the other hand, it is known that the addition of $ZrO_2$ causes an increase of the chemical resistance of the glass and also of the optical fiber made from it. The corresponding optical fibers are suitable especially for use in difficult environmental conditions. One skilled in the art is thus in a position to make optimum optical fiber by varying the ingredients PbO, $Li_2O$, BaO and $ZrO_2$ according to the requirements for index of refraction, numerical aperture (NA), chemical resistance and environmental friendliness.

TABLE I

CORE GLASS COMPOSITIONS (in % by weight, based on oxide) AND PROPERTIES THEREOF

| | 1 | 2 | 3 | 4 | 5 | 6 | 7 | 8 | Light Flint Glass* |
|---|---|---|---|---|---|---|---|---|---|
| $SiO_2$ | 44.6 | 44.6 | 45.8 | 50.9 | 46.4 | 47.7 | 48.3 | 48.6 | 53 |
| ZnO | 34.8 | 37.5 | 29.5 | 17.6 | 37.3 | 34.4 | 31.6 | 33.0 | — |
| PbO | 3.5 | 1.3 | 8.0 | 19.4 | — | — | — | — | 34 |
| $Na_2O$ | 8.0 | 9.4 | 9.0 | 8.2 | 8.3 | 8.3 | 8.1 | 8.2 | 5.9 |
| $K_2O$ | 8.9 | 7.0 | 7.5 | 3.7 | 5.8 | 5.8 | 9.1 | 9.1 | 6.9 |
| $Li_2O$ | — | — | — | — | 1.1 | 0.9 | — | — | — |
| BaO | — | — | — | — | 0.8 | 0.8 | 0.8 | 0.8 | — |
| $ZrO_2$ | — | — | — | — | — | 1.8 | 1.8 | — | — |
| Refining Agent | 0.2 | 0.2 | 0.2 | 0.2 | 0.3 | 0.3 | 0.3 | 0.3 | 0.2 |
| $n_d$ | 1.576 | 1.58 | 1.58 | 1.58 | 1.58 | 1.58 | 1.57 | 1.567 | 1.581 |
| NA | 0.522 | 0.534 | 0.534 | 0.534 | 0.534 | 0.534 | 0.504 | 0.494 | 0.537 |
| Attenuation [dB/km] at | | | | | | | | | |
| 401 nm | 272 | 263 | 338 | 628 | 397 | 360 | 273 | 171 | 634 |
| 451 nm | 170 | 251 | 190 | 370 | 335 | 334 | 282 | 153 | 427 |
| 553 nm | 80 | 117 | 86 | 165 | 228 | 163 | 140 | 96 | 226 |
| Core-cladding contact reaction | No | starting | No | No | No | No | No | No | No |

*used in prior art core glass members.

The last column of Table I includes the glass composition of a conventional light flint glass with very good transmission with associated attenuation values. Table I shows that the first embodiment according to the invention has an attenuation that is almost about a factor of 3 less than the attenuation of the light flint glass of the prior art, almost the same numerical aperture NA, but a factor of 10 less PbO content.

Even the lead-free embodiment 8 of Table I still has a factor of greater than 2 less attenuation than that of the conventional flint glass at 553 nm. In practical applications this means that the optical fiber made from the core glass/cladding glass compositions according to the invention can transmit light over more than twice to three times the distance that a conventional optical fiber made with the light flint glass can.

Conversely the cross-sectional area of a light guide transmitting light can be reduced for the same transmission distance and the same total intensity of transmitted light when the optical fibers according to the invention with the lower attenuation are used.

An example for the case of an optimum core glass embodiment 1 (see Table I, 80 dB/km) in comparison to conventional light flint glass (see last column, 226 dB/km) for a wavelength λ=553 and a transmission distance of 20 m should illustrate this latter result. In this case only half the bundle cross-sectional area of a light guide made with the optical fiber according to core glass embodiment 1 is required in order to transmit the same light quantity with the given distance of 20 m as with a light guide made with conventional flint glass fiber. This mean in practice that a considerable cost savings results based on the reduced optical fiber requirements.

A glass with the following composition: 44.7% by weight, $SiO_2$; 39.9% by weight ZnO; 7.9% by weight $Na_2O$; 7.3% by weight, $K_2O$ and 0.2% by weight refining agent, is a counter example of an unsuitable lead-free core glass variant. The core glass acting as counter example of course has an index of refraction $n_d$ of 1.58 and a numerical aperture NA of 0.534. However because of the high degree of crystallization at the boundary surface between the core glass and the cladding glass no attenuation values could be measured in the observed region between 401 nm and 553 nm. Thus this glass is not usable in an optical fiber.

In a second series of experiments only a single core glass type, i.e. the above-described best embodiment No. 1, was drawn with a variety of different cladding glasses of different composition to form optical fiber. Five different cladding glass compositions were used in the drawing experiments.

Table II shows the compositions of the five different cladding glasses. These cladding glasses include three alkali borosilicate glasses, Nos. 1, 4 and 5 and a soda lime glass (No. 2) and an alkali-alumino-silicate glass (No. 3).

The results for the attenuation measurements for the different fiber types are shown in tabular form in Table III and also in graphical form in FIG. 3.

As mentioned above on the cladding glass of type 1, alkali-borosilicate glass No. 1, provides the best results, e.g. for attenuation (131 dB/km at λ=554 nm; note: the fact that the attenuation value here is not as in Table I at 80 dB/km is caused by the somewhat higher impurities in the economical raw materials for the core glass used in this melt series).

TABLE II

CLADDING GLASS COMPOSITIONS (in % by weight, based on oxide)

|  | 1 | 2 | 3 | 4 | 5 |
|---|---|---|---|---|---|
| $SiO_2$ | 69 | 70 | 68 | 81 | 75 |
| $B_2O_3$ | 19 | 1 | 3 | 12 | 10 |
| $Al_2O_3$ | 3 | 4 | 8 | 2.5 | 5 |

TABLE II-continued

CLADDING GLASS COMPOSITIONS (in % by weight, based on oxide)

|  | 1 | 2 | 3 | 4 | 5 |
|---|---|---|---|---|---|
| $Na_2O$ | 1 | 13 | 15 | 3.5 | 7 |
| $K_2O$ | 8 | 2.3 | — | 1 | 0.1 |
| $Li_2O$ | — | — | 1 | — | — |
| MgO | — | 2.5 | — | — | — |
| BaO | — | 2 | — | — | — |
| CaO | — | 5 | 3 | — | 1.4 |
| ZnO | — | — | 1.5 | — | — |
| F | — | 0.2 | 0.5 | — | 0.2 |

TABLE III

PROPERTIES OF OPTICAL FIBER MADE FROM CORE GLASS AND CLADDING GLASS EMBODIMENTS OF TABLE II

| Cladding Glass No. | Core Glass No. | Attenuation [dB/km] at λ = | | | | Devitrification/Contact reaction |
|---|---|---|---|---|---|---|
|  |  | 400 nm | 452 nm | 554 nm | 642 nm |  |
| 1 | 1 | 365 | 264 | 131 | 161 | No |
| 2 | 1 | 461 | 346 | 213 | 252 | No |
| 3 | 1 | 521 | 402 | 263 | 293 | Very weak |
| 4 | 1 | 670 | 565 | 425 | 445 | Starting |
| 5 | 1 | 1897 | 1863 | 1727 | 1748 | Strong |
| 1 | 8 Pb-free | 171 | 153 | 96 | 113 | No |

The second best optical fiber embodiment with the soda lime glass as cladding material (cladding glass No. 2) already has considerably poorer attenuation values (about 30 to 60% higher values, depending on the wavelength) over the entire spectral range than those of the best embodiment. The cladding glass No. 3, an alkali-alumino-silicate glass, has attenuation values that are about a factor of two poorer (greater) than the corresponding values for the best embodiment corresponding to cladding glass No. 1 over the entire wavelength range.

It is astonishing that other optical fibers with cladding glasses from the same glass family of borosilicate glasses as the best embodiment, cladding glass No. 1, namely cladding glass Nos. 4 and 5, provide only the poorest attenuation results. However these latter glass compositions exhibit strong to initial devitrification due to the contact reaction of the cladding glass with the core glass at the boundary between them. It should be mentioned that the composition of both these cladding glasses differs from the borosilicate glass type 1 significantly (see Table II), especially because of a lower boron content and higher silicon content (No. 4) and/or addition ingredients, such as Ba, Ca and F (No. 5).

The attenuation behavior of the optical fiber according to the invention with the same optimum core glass according to embodiment No. 1 in Table I is shown in the figure with poorer raw material quality and different cladding glasses. The numbers 1 to 5 on the respective curves correspond to the different cladding glass embodiments Nos. 1 to 5 in Table II. Also the number 6 in the figure designates the results for a lead-free optical fiber embodiment made from core glass embodiment No. 8 and the cladding glass embodiment 1 (see Table II), which has the smallest attenuation under 200 dB/km over the entire spectral range.

The disclosure in German Patent Application 102 45 987.8-51 of Oct. 2, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in stepped optical fibers from multicomponent glasses and their uses, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A stepped optical fiber from multicomponent glass, said stepped optical fiber having a numerical aperture $\geqq 0.50$ and comprising a core glass member and a cladding glass member, said cladding glass member completely surrounding said core glass member, wherein said core glass member has a core glass composition, which comprises

| | |
|---|---|
| $SiO_2$ | 42 to 53% by weight, |
| ZnO | 16 to 38% by weight, |
| PbO | 1 to 20% by weight, |
| $Na_2O$ | <14% by weight, |
| $K_2O$ | <12% by weight, | wherein a sum total of ZnO and PbO $\geqq 30\%$ by weight and a sum total of $Na_2O$ and $K_2O$ is $\geqq 2\%$ by weight; and wherein said cladding glass member has a cladding glass composition, which comprises

| | |
|---|---|
| $SiO_2$ | 60 to 72% by weight, |
| $B_2O_3$ | <20% by weight, |
| $Al_2O_3$ | <10% by weight, |
| $Na_2O$ | <18% by weight, |
| $K_2O$ | <15% by weight. |

2. The stepped optical fiber as defined in claim 1, wherein said core glass composition and/or said cladding glass composition includes at least one refining agent in a standard amount for refining.

3. The stepped optical fiber as defined in claim 1, wherein said core glass member contains from 2 to 12 percent by weight of said PbO.

4. The stepped optical fiber as defined in claim 1, wherein said core glass member contains <0.9 percent by weight of BaO.

5. A stepped optical fiber from multicomponent glass, said stepped optical fiber having a numerical aperture $\geqq 0.48$ and comprising a core glass member and a cladding glass member, said cladding glass member completely surrounding said core glass member, wherein said core glass member has a core glass composition, which comprises

| | |
|---|---|
| $SiO_2$ | 42 to 53% by weight, |
| ZnO | 30 to 38% by weight, |
| $Na_2O$ | <14% by weight, |
| $K_2O$ | <12% by weight, |
| BaO | <0.9% by weight. | wherein a sum total of $Na_2O$ and $K_2O$ is $\geqq 2\%$ by weight; and wherein the cladding glass member has a cladding glass composition, which comprises.

| | |
|---|---|
| $SiO_2$ | 60 to 72% by weight, |
| $B_2O_3$ | <20% by weight, |
| $Al_2O_3$ | <10% by weight, |
| $Na_2O$ | <18% by weight, |
| $K_2O$ | <15% by weight. |

6. The stepped optical fiber as defined in claim 5, wherein said core glass composition and/or said cladding glass composition includes at least one refining agent in a standard amount for refining.

7. The stepped optical fiber as defined in claim 5, wherein said core glass member contains less than one percent by weight of PbO.

8. The stepped optical fiber as defined in claim 5, wherein said core glass member contains <2 percent by weight of fluorine.

9. The stepped optical fiber as defined in claim 5, wherein said core glass member contains <0.5 percent by weight of fluorine.

10. The stepped optical fiber as defined in claim 5, wherein said core glass member contains less than three percent by weight $Li_2O$.

11. The stepped optical fiber as defined in claim 10, wherein a sum total of said $Li_2O$+said $Na_2O$+said $K_2O$ is greater than or equal to 2 percent by weight.

12. The stepped optical fiber as defined in claim 11, wherein said sum total of said $Li_2O$+said $Na_2O$+said $K_2O$ is greater than or equal to 5 percent by weight.

13. The stepped optical fiber as defined in claim 5, wherein said core glass member contains $ZrO_2$ and said $ZrO_2$ is present in an amount of less than two percent by weight.

14. The stepped optical fiber as defined in claim 5, wherein said core glass member contains MgO and said MgO is present in an amount of less than six percent by weight.

15. The stepped optical fiber as defined in claim 5, wherein said core glass member contains CaO and said CaO is present in an amount of less than five percent by weight.

16. The stepped optical fiber as defined in claim 5, wherein said core glass member contains SrO and said SrO is present in an amount of less than six percent by weight.

17. The stepped optical fiber as defined in claim 5, wherein said core glass member contains $B_2O_3$ and said $B_2O_3$ is present in an amount of less than one percent by weight.

18. The stepped optical fiber as defined in claim 5, wherein said core glass member contains $Al_2O_3$ and said $Al_2O_3$ is present in an amount of less than 1.5 percent by weight.

19. The stepped optical fiber as defined in claim 1, wherein said cladding glass member contains $Li_2O$ and said $Li_2O$ is present in an amount of less than two percent by weight.

20. The stepped optical fiber as defined in claim 1, wherein said cladding glass member contains MgO and said MgO is present in an amount of less Than three percent by weight.

21. The stepped optical fiber as defined in claim 1, wherein said cladding glass member contains BaO and said BaO is present in an amount of less than three percent by weight.

22. The stepped optical fiber as defined in claim 1, wherein said cladding glass member contains SrO and said SrO is present in an amount of less than tour percent by weight.

23. The stepped optical fiber as defined in claim 1, wherein said cladding glass member contains CaO and said CaO is present in an amount of less than six percent by weight.

24. The stepped optical fiber as defined in claim 1, wherein said cladding glass member contains ZnO and said ZnO is present in an amount of less than three percent by weight.

25. The stepped optical fiber as defined in claim 1, wherein said cladding glass member contains F and said F present in an amount of less than one percent by weight.

26. The stepped optical fiber as defined in claim 1, wherein said cladding glass member contains $Li_2O$ and wherein a sum total of said $Li_2O$, $Na_2O$ and $K_2O$ is $\geqq 3\%$ by weight.

27. The stepped optical fiber as defined in claim 1, wherein said cladding glass member contains from 66 to 72 percent by weight of said $SiO_2$.

28. A method of transmitting light, said method comprising passing said light through said stepped optical fiber according to claim 1.

29. A light guide comprising a bundle of said stepp d optical fibers according to claim 1.

30. A method of data transmission, said method comprising transmitting an optical signal encoded with data through said stepped optical fiber according to claim 1.

31. A motor vehicle including a stepped optical fiber according to claim 1.

32. The motor vehicle as defined in claim 31, wherein said stepped optical fiber transmits light for vehicle lighting.

33. A vehicle traffic signal device comprising a stepped optical fiber according to claim 1.

34. A railroad signal device comprising a stepped optical fiber according to claim 1.

35. An alphanumeric display comprising a stepped optical fiber according to claim 1.

36. A cold light source comprising a stepped optical fiber according to claim 1.

37. An endocope for medical and engineering purposes, said endoscope comprising a stepped optical fiber according to claim 1.

38. A method of illuminating an operation microscope, said method comprising using said stepped optical fiber according to claim 1.

* * * * *

UNITED STATES PATENT AND TRADEMARK OFFICE
CERTIFICATE OF CORRECTION

PATENT NO. : 7,072,562 B2  Page 1 of 1
APPLICATION NO. : 10/674601
DATED : July 4, 2006
INVENTOR(S) : R. Domres et al.

It is certified that error appears in the above-identified patent and that said Letters Patent is hereby corrected as shown below:

On the title page, item: [73] delete "Schott Glas" and substitute --Schott AG--

Signed and Sealed this

Thirteenth Day of May, 2008

JON W. DUDAS
*Director of the United States Patent and Trademark Office*